United States Patent
Roberts et al.

(10) Patent No.: US 7,147,923 B2
(45) Date of Patent: Dec. 12, 2006

(54) FLEXIBLE POLYMER WINDOW

(75) Inventors: Gary P. Roberts, Stillwater, MN (US); Patrick J. Hager, Woodbury, MN (US); Jeffrey R. Janssen, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 26 days.

(21) Appl. No.: 10/740,986

(22) Filed: Dec. 19, 2003

(65) Prior Publication Data

US 2005/0136263 A1    Jun. 23, 2005

(51) Int. Cl.
*B32B 27/30* (2006.01)
*B32B 27/32* (2006.01)
*B32B 27/40* (2006.01)

(52) U.S. Cl. ............... 428/423.3; 428/424.2; 428/424.8

(58) Field of Classification Search ........... 428/423.1, 428/423.3, 424.2, 424.8
See application file for complete search history.

(56) References Cited

U.S. PATENT DOCUMENTS

| | | | |
|---|---|---|---|
| 4,017,661 A * | 4/1977 | Gillery | 428/412 |
| 4,404,258 A | 9/1983 | Loewrigkeit et al. | |
| 4,540,622 A | 9/1985 | Brunion et al. | |
| 4,594,385 A | 6/1986 | Thoma et al. | |
| 4,799,346 A * | 1/1989 | Bolton et al. | 52/509 |
| 4,973,511 A * | 11/1990 | Farmer et al. | 428/216 |
| 5,422,189 A * | 6/1995 | Warner et al. | 428/480 |
| 5,773,077 A | 6/1998 | Edmond | |
| 6,258,918 B1 | 7/2001 | Ho et al. | |
| 6,313,335 B1 | 11/2001 | Roberts et al. | |
| 6,376,082 B1 | 4/2002 | Edmond et al. | |
| 6,383,644 B1 * | 5/2002 | Fuchs | 428/424.8 |

FOREIGN PATENT DOCUMENTS

| | | |
|---|---|---|
| CA | 969820 | 6/1975 |
| DE | 41 19 273 A1 | 12/1992 |
| EP | 0 009 884 A1 | 4/1980 |
| EP | 1 318 011 A1 | 6/2003 |
| EP | 1318011 A1 * | 6/2003 |

* cited by examiner

*Primary Examiner*—Thao T. Tran
(74) *Attorney, Agent, or Firm*—Douglas B. Little (57) ABSTRACT

A flexible window is formed by a multi-layer sheet having a transparent flexible base layer and one or more transparent flexible protective layers, wherein the protective layers have a greater abrasion resistance than the base layer. The base layer and the protective layers are formed of substantially plasticizer-free polymeric materials.

9 Claims, 2 Drawing Sheets

FLEXIBLE POLYMER WINDOW

FIELD OF THE INVENTION

The present invention relates to flexible windows for use with structures capable of being rolled up or folded for storage. In particular, the present invention relates to flexible windows that are abrasion resistant and transparent.

BACKGROUND

Flexible windows are employed in a variety of structures that are capable of being rolled up or folded for storage. Such structures include canopies for automobiles and marine craft, convertible tops, tents, and awning systems. Current flexible windows are commonly made with polyvinyl chloride (PVC), which initially exhibits good flexibility and transparency properties. However, flexible PVC windows have a limited performance life due to discoloration after prolonged exposure to ultra-violet (UV) radiation. Also, flexible PVC windows may become scratched due to abrasion by contact with hard items. Thus, the optical qualities and appearance of flexible PVC windows become compromised, and periodic replacement of the flexible PVC window becomes desirable. Additionally, materials such as PVC contain plasticizers that help impart the flexibility property of the flexible PVC windows. Plasticizers are known migratory additives that eventually migrate to the surfaces of the flexible PVC windows. As such, plasticizers are not conducive to long-term transparency of flexible windows.

Windows made from materials such as glass and polycarbonate are also available, and generally exhibit greater UV-radiation resistance than materials made from PVC. Nonetheless, glass and polycarbonate windows are rigid, which limits use of these materials in windows of structures requiring windows capable of being rolled up or folded for storage.

SUMMARY

The present invention is directed to a multi-layer sheet that functions as a window for use with structures requiring windows capable of being rolled up, being folded, resisting abrasion, and resisting sunlight-induced weathering. The multi-layer sheet includes a transparent flexible base layer and a first transparent flexible protective layer, of which the first protective layer has a greater abrasion resistance than the base layer. Additionally, both the base layer and the first protective layer are formed of substantially plasticizer-free polymeric materials.

The multi-layer sheet may also include a second transparent flexible protective layer, wherein the base layer is disposed between the first protective layer and the second protective layer.

The present invention is further directed to a method of making a multi-layer sheet that functions as a window for use with structures requiring windows capable of being rolled up, being folded, resisting abrasion, and resisting sunlight-induced weathering. The method includes bonding a transparent flexible base layer to a first transparent flexible protective layer having a greater abrasion resistance than the base layer. Both the base layer and the first protective layer are formed of substantially plasticizer-free polymeric materials.

The method may also include bonding the base layer to a second transparent flexible protective layer on an opposite side of the base layer from the first protective layer; the second protective layer also having a greater abrasion resistance than the base layer, and is formed of a substantially plasticizer-free polymeric material.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

DETAILED DESCRIPTION

Figure 1:
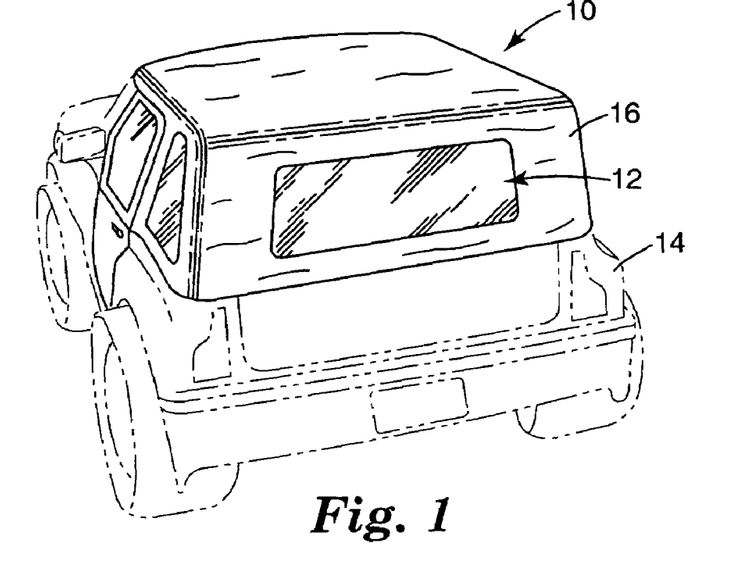
FIG. 1 is a perspective view of the present invention in use.

The present invention, depicted as a flexible window 12 in FIG. 1, may be incorporated into a variety of structures, such as canopy 10. The present invention, further depicted as windows 12a–12d in FIGS. 2–5, includes a multi-layer sheet that has at least two polymer layers. The windows 12a–12d are made of materials that are transparent, abrasion resistant, weatherable, flexible, dimensionally stable, and substantially free of plasticizers.

Figure 2:
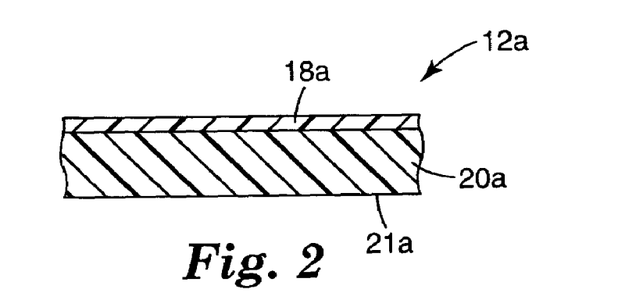
FIG. 2 is a sectional view of a multi-layer sheet of the present invention.

The window 12a, as best depicted in FIG. 2, includes a first polymer layer and a second polymer layer, which are referred to as a protective layer 18a and a base layer 20a, respectively. The protective layer 18a is an outer layer that provides abrasion protection to the base layer 20a. Examples of suitable materials for the protective layer 18a are disclosed below under the section entitled "Protective Layer Materials". Polyurethanes are exemplary of desired materials for the protective layer 18a due to the known abrasion resistance and transparency of polyurethanes. The base layer 20a generally comprises the bulk of the multi-layer sheet, by both thickness and weight, and is preferably derived from less-expensive materials compared to the protective layer 18a. Examples of suitable materials for the base layer 20a are disclosed below under the section entitled "Base Layer Materials".

The protective layer 18a and the base layer 20a may also incorporate additives, such as antioxidants and ultraviolet (UV)-radiation absorbers. Examples of suitable additives for the protective layer 18a and the base layer 20a are disclosed below under the section entitled "Additives".

The bond strength exhibited between the protective layer 18a and the base layer 20a is adequate to prevent interlayer delamination during use. Therefore, the protective layer 18a may be bonded directly to the base layer 20a without requiring adhesive tie layers. This is beneficial as adhesive tie layers may hinder the transparency and increase the complexity and cost of manufacturing the present invention. Adhesive tie layers may be used to further enhance interlayer bond strengths. However, it is to be understood that any layer of the construction should not impair the transparency of the flexible window.

Suitable thicknesses of the window 12a include a minimum thickness of about 0.25 millimeters (mm), and a maximum thickness of about 1.52 mm. Particularly suitable thicknesses of window 12a include a minimum thickness of about 0.51 mm and a maximum thickness of about 1.02 mm. Suitable thicknesses of the protective layer 18a depend upon the material from which the protective layer 18a is made. If, for example, the protective layer 18a consists of polyurethane, suitable thicknesses of the protective layer 18a include a minimum thickness of about 0.05 mm and a maximum thickness of about 0.13 mm. Alternatively, if the protective layer 18a consists of cured acrylic, suitable thicknesses of the protective layer 18a include a minimum thickness of about 0.008 mm and a maximum thickness of about 0.012 mm. The differences in thickness between the window 12a and the protective layer 18a are made up by the base layer 20a. Table 1 illustrates suitable thickness ratios between the protective layer 18a and the base layer 20a, where the protective layer 18a is comprised of polyurethane.

TABLE 1

| Window 12a Thickness (mm) | Protective Layer 18a Thickness (mm) | Base Layer 20a Thickness (mm) |
|---|---|---|
| 0.51 | 0.05 | 0.46 |
| 0.51 | 0.13 | 0.38 |
| 0.76 | 0.05 | 0.71 |
| 0.76 | 0.13 | 0.63 |
| 1.02 | 0.05 | 0.97 |
| 1.02 | 0.13 | 0.89 |

The window 12a is a two-layer sheet that exhibits, among other characteristics, the properties of being transparent, abrasion resistant, weatherable, flexible, dimensionally stable, and substantially free of plasticizers. As a note, the base layer 20a has an exposed planar surface 21a. A suitable orientation of the window 12a is to expose the protective layer 18a to more extreme external conditions. For example, where the window 12a is used with a vehicle, such as depicted in FIG. 1, the window 12a may be oriented such that the protective layer 18a faces outside of the vehicle. This orients the planar surface 21a of the base layer 20a to face inside the vehicle, and allows the protective layer 18a to be exposed to a majority of the abrasive conditions (e.g., rain, snow, sleet, windborne particles, and road debris).

Figure 3:
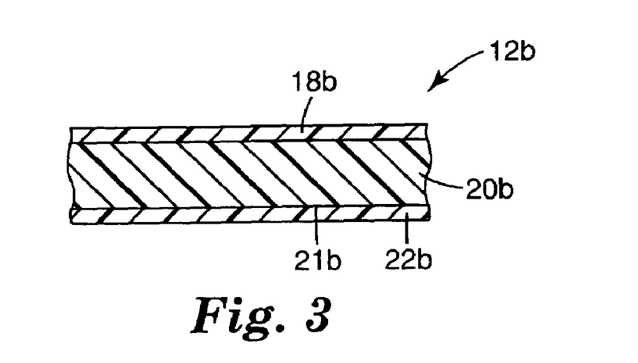
FIG. 3 is a sectional view of an alternative example of the multi-layer sheet of the present invention.

The window 12b, as best depicted in FIG. 3, includes three polymer layers, which are referred to as a protective layer 18b, a base layer 20b, and a protective layer 22b. The window 12b is similar to the window 12a in FIG. 2, but has the base layer 20b disposed between the protective layers 18b, 22b. The protective layer 22b provides additional abrasion protection to a planar surface 21b of the base layer 20b.

The bond strengths exhibited between the protective layer 18b and the base layer 20b, and between the protective layer 22b and the base layer 20b, are adequate to prevent interlayer delamination during use. Therefore, the protective layers 18b, 22b may be bonded directly to the base layer 20b without requiring adhesive tie layers. Adhesive tie layers may be used to further enhance interlayer bond strengths. However, it is preferred that the adhesive tie layers used do not substantially reduce the transparency of the window 12b.

The protective layer 18b and the base layer 20b are analogous to the protective layer 18a and the base layer 20a as discussed in FIG. 2. Examples of suitable materials for the protective layers 18b, 22b are disclosed below under the section entitled "Protective Layer Materials". Polyurethanes are exemplary of desired materials for the protective layers 18b, 22b. Examples of suitable materials for the base layer 20b are disclosed below under the section entitled "Base Layer Materials".

Suitable thicknesses of the window 12b include a minimum thickness of about 0.25 mm, and a maximum thickness of about 1.52 mm. Particularly suitable thicknesses of the window 12b include a minimum thickness of about 0.51 mm and a maximum thickness of about 1.02 mm. Suitable thicknesses of the protective layers 18b, 22b may be determined in the same manner as the suitable thicknesses for the protective layer 18a discussed above regarding FIG. 2. Correspondingly, the differences in thickness between the window 12b and the combined thicknesses of the protective layers 18b, 22b are made up by the base layer 20b. Table 2 illustrates suitable thickness ratios between the protective layers 18b, 22b and the base layer 20b, where the protective layers 18b, 22b are comprised of polyurethane.

TABLE 2

| Window 12b Thickness (mm) | Protective Layer 18b Thickness (mm) | Base Layer 20b Thickness (mm) | Protective Layer 22b Thickness (mm) |
|---|---|---|---|
| 0.51 | 0.05 | 0.41 | 0.05 |
| 0.51 | 0.13 | 0.25 | 0.13 |
| 0.76 | 0.05 | 0.66 | 0.05 |
| 0.76 | 0.13 | 0.50 | 0.13 |
| 1.02 | 0.05 | 0.92 | 0.05 |
| 1.02 | 0.13 | 0.76 | 0.13 |

The window 12b illustrates a three-layer window that exhibits the benefits and characteristics of the window 12a, including the properties of being transparent, abrasion resistant, weatherable, flexible, dimensionally stable, and substantially free of plasticizers. Additionally, the window 12b has both planar surfaces of the base layer 20b protected from abrasion. This allows the window 12b to be used in situations in which both planar surfaces of the window 12b are subjected to abrasive conditions. This allows either planar surface of the window 12b to be oriented to face external conditions, which may reduce installation time.

Figure 4:
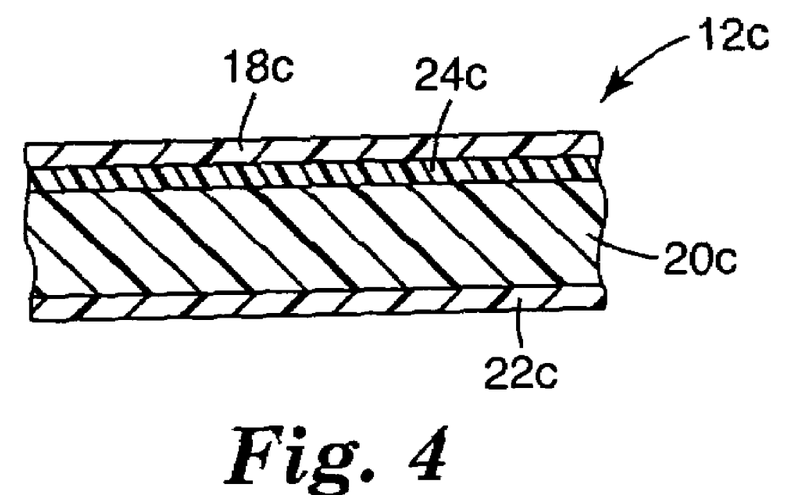
FIG. 4 is a sectional view of a second alternative example of the multi-layer sheet of the present invention.

The window 12c, as best depicted in FIG. 4, includes four polymer layers, which are referred to as a protective layer 18c, a base layer 20c, a protective layer 22c, and an intermediate layer 24c. The base layer 20c is disposed between the protective layer 22c and the intermediate layer 24c. The intermediate layer 24 is likewise disposed between the protective layer 18c and the base layer 20c.

The bond strengths exhibited between the protective layer 18c and the intermediate layer 24c, between the base layer 20c and the intermediate layer 24c, and between the base layer 20c and the protective layer 22c are adequate to prevent interlayer delamination during use. Therefore, the base layer 20c may be bonded directly to the protective layer 22c and the intermediate layer 24c without requiring adhesive tie layers. Similarly, the intermediate layer 24c may be bonded directly to the protective layer 18c without requiring an adhesive tie layer. Adhesive tie layers may be used to further enhance interlayer bond strengths.

The protective layers 18c, 22c and the base layer 20c are respectively analogous to the protective layers 18b, 22b and the base layer 20b as discussed in FIG. 3. Examples of suitable materials for the protective layers 18c, 22c are disclosed below under the section entitled "Protective Layer Materials". Polyurethanes are exemplary of desired materials for the protective layers 18c, 22c. Examples of suitable materials for the base layer 20c are disclosed below under the section entitled "Base Layer Materials". Examples of suitable materials for the intermediate layer 24c may include materials disclosed below under the sections entitled "Protective Layer Materials" and "Base Layer Materials". The type of material used for the intermediate layer 24c may vary based upon the purpose of incorporating the intermediate layer 24c into the window 12c. Examples of purposes of incorporating the intermediate layer 24c may include altering rheological characteristics, increasing strength and durability, and reducing manufacturing costs.

Suitable thicknesses of the base layer 20c are the differences in thickness between the window 12c and the combined thicknesses of the protective layers 18c, 22c and the intermediate layer 24c. Table 3 illustrates suitable thickness ratios between the protective layers 18c, 22c, the base layer 20c, and the intermediate layer 24c, where the protective layers 18c, 22c are comprised of polyurethane.

TABLE 3

Figure 5:
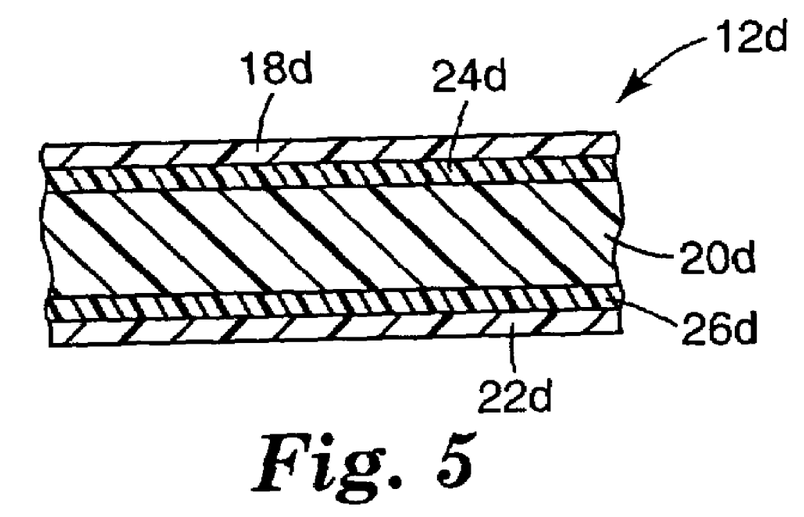
FIG. 5 is a sectional view of a third alternative example of the multi-layer sheet of the present invention.

| Window 12c Thickness (mm) | Protective Layer 18c Thickness (mm) | Intermediate Layer 24c Thickness (mm) | Base Layer 20c Thickness (mm) | Protective Layer 22c Thickness (mm) |
|---|---|---|---|---|
| 0.51 | 0.05 | 0.05 | 0.36 | 0.05 |
| 0.51 | 0.05 | 0.13 | 0.28 | 0.05 |
| 0.51 | 0.13 | 0.05 | 0.20 | 0.13 |
| 0.51 | 0.13 | 0.13 | 0.12 | 0.13 |
| 0.76 | 0.05 | 0.05 | 0.61 | 0.05 |
| 0.76 | 0.05 | 0.13 | 0.53 | 0.05 |
| 0.76 | 0.13 | 0.05 | 0.45 | 0.13 |
| 0.76 | 0.13 | 0.13 | 0.37 | 0.13 |
| 1.02 | 0.05 | 0.05 | 0.87 | 0.05 |
| 1.02 | 0.05 | 0.13 | 0.79 | 0.05 |
| 1.02 | 0.13 | 0.05 | 0.71 | 0.13 |
| 1.02 | 0.13 | 0.13 | 0.63 | 0.13 | during use. The base layer 20d may be bonded directly to the intermediate layers 24d, 26d without requiring adhesive tie layers. Similarly, the intermediate layer 24d may be bonded directly to the protective layer 18d, and the intermediate layer 26d may be bonded directly to the protective layer 22d without requiring adhesive tie layers.

The protective layers 18d, 22d and the base layer 20d are respectively analogous to the protective layers 18b, 22b and the base layer 20b discussed in FIG. 3. Polyurethanes are exemplary of desired materials for the protective layers 18d, 22d. Examples of suitable materials for the intermediate layers 24d, 26d may include materials disclosed below under the sections entitled "Protective Layer Materials" and "Base Layer Materials". The types of materials used for the intermediate layers 24d, 26d may vary based upon the purpose of incorporating the intermediate layers 24d, 26d into window 12d.

Suitable thicknesses of the protective layers 18d, 22d may be determined in the same manner as the suitable thicknesses for the protective layers 18a, 18b, 22b discussed above. Suitable thickness of the intermediate layers 24d, 26d depend upon the materials from which they are made. Examples of suitable thicknesses of the intermediate layers 24d, 26d may include thicknesses similar to the thicknesses of the protective layers 18d, 22d.

Suitable thicknesses of the base layer 20d are the differences in thickness between the thicknesses of the window 12d and the combined thicknesses of the protective layers 18d, 22d and the intermediate layers 24d, 26d. Table 4 illustrates suitable thickness ratios between the protective layers 18d, 22d, the base layer 20d, and the intermediate layers 24d, 26d, where the protective layers 18d, 22d are comprised of polyurethane.

TABLE 4

| Window 12d Thickness (mm) | Protective Layer 18d Thickness (mm) | Intermediate Layer 24d Thickness (mm) | Base Layer 20d Thickness (mm) | Intermediate Layer 26d Thickness (mm) | Protective Layer 22d Thickness (mm) |
|---|---|---|---|---|---|
| 0.51 | 0.05 | 0.05 | 0.31 | 0.05 | 0.05 |
| 0.51 | 0.05 | 0.13 | 0.15 | 0.13 | 0.05 |
| 0.51 | 0.13 | 0.05 | 0.15 | 0.05 | 0.13 |
| 0.76 | 0.05 | 0.05 | 0.56 | 0.05 | 0.05 |
| 0.76 | 0.05 | 0.13 | 0.40 | 0.13 | 0.05 |
| 0.76 | 0.13 | 0.05 | 0.40 | 0.05 | 0.13 |
| 0.76 | 0.13 | 0.13 | 0.24 | 0.13 | 0.13 |
| 1.02 | 0.05 | 0.05 | 0.82 | 0.05 | 0.05 |
| 1.02 | 0.05 | 0.13 | 0.66 | 0.13 | 0.05 |
| 1.02 | 0.13 | 0.05 | 0.66 | 0.05 | 0.13 |
| 1.02 | 0.13 | 0.13 | 0.50 | 0.13 | 0.13 |

Similar to the window 12c, the window 12d, as best depicted in FIG. 5, includes five polymer layers, referred to as the protective layer 18d, the base layer 20d, the protective layer 22d, the intermediate layers 24d, 26d. The base layer 20d is disposed between the intermediate layers 24d and 26d. The intermediate layer 24d is disposed between the protective layers 18d and the base layer 20d, and the intermediate layer 26d is disposed between the base layer 20d and the protective layer 22d.

The bond strengths exhibited between the various layers in FIG. 5 are adequate to prevent interlayer delamination While the present invention is depicted in FIGS. 4 and 5 as having one or two intermediate layers in the noted placements, the present invention is not intended to be limited as such. The present invention may also include additional intermediate layers, and/or alternative placements of the intermediate layers.

The present invention may be used with a variety of structures that require windows capable of being rolled up or folded, for example the canopy 10 in FIG. 1. The canopy 10 is attached to a truck 14. While illustrated in use as a bed cover for the truck 14, the canopy 10 may be any other structure capable of being rolled up or folded for storage, such as a canopy for a boat, a convertible top, a tent, or an awning system.

The canopy 10 includes an opaque portion 16 that surrounds the flexible window 12. The opaque portion 16 may be made of conventional canvas materials, such as nylon or canvas, which are generally characterized as being opaque, durable, water repellant, UV-radiation blocking, and capable of being rolled up or folded. The flexible window 12 may be attached to the opaque portion 16 with a variety of techniques. Examples of several attachment techniques include mechanical, chemical, and adhesive attachments. Mechanical attachments may include sewing, outfitting the flexible window 12 with zippers or snap mechanisms, and combinations thereof. For example, the flexible window 12 may have a zipper mechanism directly sewn into it, for engaging with a zipping mechanism sewn into the opaque portion 16. In this arrangement, the flexible window 12 may be unzipped from the opaque portion 16 and individually rolled up for storage. Adhesive attachments may include bonding and thermal welding. The attachment techniques described herein allow the flexible window 12 to cooperate with the opaque portion 16 as a barrier against environmental conditions, while also allowing the flexible window 12 to serve as a viewing port through the canopy 10.

Additionally, the flexible window 12 is also suitable for use with marine craft, such as boats or ships, which are subjected to substantial heat and UV-radiation exposure, in addition to precipitation, debris, and salt water corrosion.

To function as a window, the flexible window 12 is transparent, and exhibits low initial levels of haze and high initial levels of light transmittance. For purposes of this description, the term "transparent" means having haze less than 4.5% and light transmittance greater than 90%, both when tested according to ASTM 1003-00. The initial level of haze and the initial level of transmittance are measured after formation of the flexible window 12 and prior to any abrasion or weathering.

Preferably, each layer of the flexible window 12 is substantially homogeneous. That is, each layer is substantially free of inclusions or separate phases that may interfere or scatter visible light. Such interference or scattering of visible light increases haze, and correspondingly reduces the transparency of the flexible window 12. Each layer of the flexible window 12 may include homopolymers, copolymers, or mixtures of polymers, with or without additives, so long as the high levels of transparency are maintained.

To provide continuing transparency, the flexible window 12 is abrasion resistant to prevent scratching and increased haze. Such windows may be subjected to many abrasive conditions, including, for example, wind-blown debris, hail, scraping, and vandalism. Reduction in transparency may be measured by the increase in haze of the material over time, as set forth in ASTM D1003-00.

The outer protective layers allow the inventive flexible window 12 to exhibit a low increase in haze over extended periods of use. Polyurethanes are exemplary of desired materials for the protective layers. Typically, the haze exhibited is 5% or less after an outer protective layer of the flexible window 12 is subjected to 50 abrasion cycles using CS-10F wheels with 500 gram weights, when tested according to ASTM D1044-99.

Along with abrasion resistance, the inventive windows exhibit adequate weatherability, i.e., an ability to withstand environmental conditions such as heat, UV-radiation, and moisture. The inventive windows retain good light transmittance after weathering. Inventive flexible window 12 exhibits a light transmittance preferably greater than 90%, when tested according to ASTM 1003-00, after being subjected to weathering conditions, as set forth in ASTM G155.

Flexibility is beneficial for allowing the flexible window 12 to be rolled up or folded with an accompanying opaque canopy portion, such as opaque portion 16, for storage. The inventive flexible window 12, however, is sufficiently flexible so as to allow rolling into cylindrical shape without cracking or fracturing, when tested according to ASTM D3111-99 using a 6.4 mm mandrel at 25° C.

The flexible window 12 exhibits good dimensional stability in that the flexible window 12 does not tend to shrink over time after being subjected to strain. An example of when the flexible window 12 may be subjected to strain is when the flexible window 12 is rolled up. The inventive flexible window 12 tends to recover a portion of the input strain energy, and then subsequently exhibits excellent dimensional stability.

The flexible window 12 is also substantially free of plasticizers. The inventive flexible window 12 does not require plasticizers, such as phthalates, to impart the required flexibility. As noted, plasticizers may migrate through the layers to the surfaces. This may lead to dirt accumulation, fingerprints, and other effects, which would undesirably reduce the transparency of the window. The migration may also cause loss of gloss, hazing, and interlayer delamination problems over time. Moreover, phthalates also pose disposal issues and are considered questionable in terms of human health.

Protective Layer Materials

Examples of suitable materials for the protective layers include polyurethanes, cured acrylics, and mixtures of the foregoing such as methacrylate/polyurethane copolymers, so long as the mixtures are homogeneous and transparent.

Examples of suitable polyurethanes include aliphatic thermoplastic polyurethanes, thermoset polyurethanes, UV-cured polyurethanes, polyether-based polyurethanes, polyester-based polyurethanes, and polycarbonate-based polyurethanes.

Examples of suitable aliphatic thermoplastic polyurethanes include Texin DP7-3018 Thermoplastic Polyurethanes from Bayer Corporation, Leverkusen, Germany; Deerfield Dureflex A3610 Thermoplastic Polyurethane from Deerfield Urethane, Inc., Whately, Mass., a subsidiary of Bayer Corporation; Tecoflex CLA-93A-V from Thermedics Polymer Products, Wilmington, Mass.; and Krystalgran PNO3-214, Krystalgran PE284-200 (formerly Krystalgran L433-65), Krystalgran PN3429-108, and Krystalgran PN343-200, all from Huntsman Polyurethanes, Everberg, Belgium. Additional examples of aliphatic thermoplastic polyurethanes are disclosed in Huang et al., U.S. Pat. No. 5,117,304, incorporated herein by reference.

An example of a suitable thermoset polyurethane includes a two-component system of a polyol blend and an aliphatic polyisocyanate polyurethane, in a one-to-one ratio. The two-component system is described in Ho et al., U.S. Pat. No. 6,258,918, incorporated herein by reference, and is manufactured by 3M Company, St. Paul, Minn. The polyol blend is a mixture of Tone-301 polyol (from Dow Chemical Co., Danbury, Conn.), Fomrez-55-112 polyol and Fomrez-55-225 polyol (both from Crompton Corporation, Middlebury, Conn.), Tinuvin-292 hindered amine light stabilizer (from Ciba Specialty Chemicals, Tarrytown, N.Y.), Uvinul N-539 UV light absorber (from BASF Corp., Mount Olive, N.J.), Silwet L-7607 flow agent (from Crompton Corporation, Middlebury, Conn.), and Dabco T-12 catalyst (from Air Product and Chemicals, Inc., Allentown, Pa.). An example of a suitable aliphatic polyisocyanate polyurethane is from Bayer Corporation as Desmodur XP-7100 Aliphatic Polyisocyanate Polyurethane.

Examples of suitable cured acrylics include radiation-cured acrylics and thermal-initiated acrylics. Examples of suitable radiation-cured acrylics include UV-cured acrylics, e-beam-cured acrylics, and gamma-cured acrylics, such as epoxy/methacrylate copolymers.

Base Layer Materials

Examples of suitable materials for the base layers include ionomers, semi-crystalline thermoplastic resins, fluorothermoplastics, polyurethanes, and mixtures of the foregoing, so long as the mixtures are homogeneous and transparent.

Examples of suitable ionomers include copolymers of ethylene or propylene with acrylic acid or methacrylic acid, neutralized or partially neutralized with a cation such as zinc, sodium, or magnesium. The term "ionomer" is defined Similarly, when the window 12a is used with the canopy 10, the planar surface 21a of the base layer 20a is exposed to ambient conditions. It is undesirable for the exposed planar surface 21a to have adhesive characteristics. Such a surface could collect fingerprints, dirt, and dust.

It has been found that the multi-layer sheet of the present invention may bond the protective layer 18a to the base layer 20a, even when the base layer 20a consists of an ionomer having a low melt flow index. During formation of the multi-layer sheet, described in detail below, the molten polymers of the protective layer 18a and the base layer 20a interfuse between the layers, and entangle mechanically. When the layers are cooled, the entangled polymers are locked together, bonding the protective layer 18a to the base layer 20a.

Examples of more particularly suitable ionomers for the multi-layer sheet of the present invention further include partially-neutralized ethylene-co-methacrylic acid ionomers, also referred to as partially-neutralized ethylene methacrylic copolymer ionomers, which have a chemical structure of:

herein as a thermoplastic containing ionizable carboxyl groups capable of creating ionic crosslinks between chains, resulting from a partially-neutralized copolymer of an α-olefin and a carboxylic acid monomer, in which the copolymer is partially neutralized with a cation. The most useful ionomers have a melt flow index of 7.5 g/10 minutes or less, when tested according to ASTM D1238-00 at 190° C. and with a 2.16 Kg weight. Because there are thermally reversible cross-links in the ionomers, the multi-layer sheets of the present invention may be more readily recycled than PVC films.

Examples of particularly suitable ionomers include ionomers based upon copolymers of ethylene with methacrylic acid, exhibiting a melt flow index below about 7.5 g/10 minutes, when tested according to ASTM D1238-00 at 190° C. and with a 2.16 Kg weight. Examples of more particularly suitable ionomers include ionomers having a melt flow index below about 5.0 g/10 minutes, when tested according to ASTM D1238-00 at 190° C. and with a 2.16 Kg weight.

Ionomers exhibiting a melt flow index below about 7.5 g/10 minutes, when tested according to ASTM D1238-00 at 190° C. and with a 2.16 Kg weight, exhibit high molecular weights, rendering them non-adhesive in nature. Low melt flow index polymers are desired in order to provide a base layer having desirable mechanical properties. Polymers exhibiting high melt flow indexes (i.e., low molecular weights) are typically used in adhesive tie layers due to their corresponding low melt viscosities and subsequent capacity to wet out and adhere to adjacent layers. High melt flow index polymers have inadequate strength to perform well as a base layer. In addition, processing considerations favor a base layer polymer having a more closely matched melt viscosity to the adjacent protective layer polymers.

The copolymer may alternatively be partially neutralized by cations other than sodium (Na+), such as zinc or magnesium. Partially-neutralized ethylene methacrylic copolymer ionomers are commercially available from E. I. DuPont de Nemours Co., Wilmington, Del., under the trademark "Surlyn". Examples of suitable Surlyn ionomer grades include Surlyn 1601, Surlyn 1601-2, Surlyn 1601B, Surlyn 1601B-2, Surlyn 1601-2LM, Surlyn 1605, Surlyn 1620, Surlyn 1650, Surlyn 1650SB, Surlyn 1652, Surlyn 1652-1, Surlyn 1652SB, Surlyn 1652SBR, Surlyn 1705-1, Surlyn 1706, Surlyn 1707, Surlyn 1802, Surlyn 1855, Surlyn 1857, Surlyn 1901, Surlyn 2601, Surlyn NWL, Surlyn 9020, Surlyn 9120, and Surlyn 9450.

Examples of particularly suitable Surlyn grades include Surlyn 1702, Surlyn 1706, Surlyn 1857, Surlyn 9020, Surlyn 9120, and Surlyn 9450. Surlyn 1857 is an ionomer partially neutralized with a zinc ion. Surlyn 1857 exhibits a melt flow index of 4.0 g/10 minutes when tested according to ASTM D1238-00 at 190° C. and with a 2.16 Kg weight, and a low secant modulus (46 N/mm$^2$) for a more flexible sheet, with good low temperature flexibility.

Examples of suitable semi-crystalline thermoplastic resins include polyolefin homopolymers and copolymers such as polyethylene and ethylene copolymers with other $C_2$–$C_8$ alpha-olefin polymers including low-density polyethylene, linear-low-density polyethylene, high-density polyethylene, ultra-high-molecular-weight polyethylene, polypropylene (including substantially isotactic polypropylene and substantially syndiotactic polypropylene), polyhexene, polyoctene, polyisobutylene, ethylene vinyl acetate, ethylene vinyl acetate carbon monoxide, poly(ethylene/propylene), poly(ethylene/1-butylene), poly(propylene/1-butylene), poly(ethylene/propylene/1-butylene), polyester (including poly(ethylene terephthalate), poly(ethylene butyrate), and poly(ethylene napthalate)), polyamide (including poly(hexamethylene adipamide)), polyurethane, ketones (including polyetherketone), polyphenylene sulfide, and mixtures thereof insofar as the mixtures form a flexible, transparent finished sheet.

Examples of suitable polypropylenes include Finaplas Syndiotactic polypropylene polymers from Atofina Petrochemicals, Houston, Tex., with particularly suitable grades including Finaplas 1251 and Finaplas 2091.

Examples of suitable copolymers include block and random copolymers, such as polypropylene-ethylene random copolymers, which include copolymers having at least about 90% propylene monomer units, by weight. Another suitable resin type includes styrenic block copolymers such as Kraton G-1657 linear triblock copolymer based on styrene and ethylene-butylene. Kraton G-1657 is available from Kraton Polymers U.S. LLC, Houston, Tex. Other block copolymers include transparent systems having alternate soft and hard segments.

Fluorothermoplastics are known for exhibiting low processing temperatures, good flexibility, and transparency. Examples of suitable fluorothermoplastics include those commercially available from Dyneon, LLC., Oakdale, Minn. under the trademark "Dyneon", including Dyneon THV 220A, Dyneon THV 220D, Dyneon THV 220G, Dyneon THV 500A, and Dyneon THV 500G.

Examples of suitable polyurethanes include the polyurethanes listed under the section entitled "Protective Layer Materials". It is preferable to use the other listed materials, such as ionomers, for the base layer, in order to reduce costs.

Additives

The multi-layer sheet of the present invention may also include a variety of resin additives. Such resin additives may exist in varying quantities in selective layers or in all of the layers, as required.

Examples of suitable additives include dyes, fillers for modifying rheological characteristics, anti-static agents, processing aids, nucleating or clarifying agents for enhancing clarity, optical brighteners for enhancing visual aesthetics, antioxidants, photostabilizing agents including UV stabilizing agents, and other property modifiers. Typically such materials are compounded in a polymer resin before it is made into a sheet.

Examples of suitable fillers include pigments, fumed silica, calcium carbonate, talc, diatomaceous earth, titanium dioxide, carbon fibers, carbon black, glass beads, glass bubbles, mineral fibers, clay particles, metal particles and the like.

An example of a suitable pigment includes Irgalite Blue BSP from Ciba Specialty Chemicals, Tarrytown, N.Y.

Examples of suitable silicone polyether copolymers include Dow Corning 19 Additive and Dow Corning 28 Additive, both from Dow Corning Corp., Midland, Mich.

An example of a suitable clarifying nucleating agent includes Millad 3988, from Milliken Chemical, Spartanburg, S.C.

An example of a suitable optical brightener includes 2,5 thiophenediylbis-(5-tert-butyl-1,3-benzoxazole) from Ciba Specialty Chemicals, Inc., Tarrytown, N.Y., under the designation Uvitex OB.

Other suitable additives such as flame retardants, stabilizers, compatibilizers, antimicrobial agents (e.g., zinc oxide), electrical conductors, corrosion inhibitors, anti-fogging agents, photochromic agents, and thermal conductors (e.g., aluminum oxide, boron nitride, aluminum nitride, and nickel particles) may also be blended into the polymer resins used to form the multi-layer sheet. Additional examples of suitable resin additives are disclosed in Roberts et al., U.S. Pat. No. 6,313,335, incorporated herein by reference.

Examples of suitable photostabilizing compounds include various hindered amine compounds, tris-aryl triazine compounds, benzotriazole and dimerized benzotriazole compounds, benzophenone and dimerized benzophenone compounds, benzoxazinone compounds, cyanoacrylate compounds as well as amide functional compounds and compounds disclosed in Olson et al., U.S. Pat. No. 5,994,431, incorporated herein by reference.

Examples of particularly suitable photostabilizing compounds include Tinuvin 123 (hindered amine light stabilizer), Tinuvin 144 (hindered amine light stabilizer), Tinuvin 292 (hindered amine light stabilizer), Tinuvin 328 (UV absorber), Tinuvin 770 (hindered amine light stabilizer), and Chemissorb 944 (UV absorber), all from Ciba Specialty Chemicals, Tarrytown, N.Y. Another example of a suitable photostabilizing compound includes Cyabsorb UV-1164 from Cytec Industries, Inc., West Paterson, N.J.

An example of a suitable antioxidant includes Irganox B215 antioxidant from Ciba Specialty Chemicals, Inc., Tarrytown, N.Y.

Examples of suitable organic and inorganic photochromic substances include naphthopyrans, spironaphthopyrans, fulgides, fulgimides, salicylates, triazoles, oxazoles, azobenzenes, and silver halides.

Preferred systems may additionally include, in an amount that does not adversely affect the desired properties described herein, a resin of synthetic or natural origin having a molecular weight between about 300 and 8000 g/mole, and having a softening point between about 60° C. and 180° C. Typically, such a resin is chosen from one of four main classes: petroleum resins, styrene resins, cyclopentadiene resins, and terpene resins. Optionally, resins from any of these classes may be partially or fully hydrogenated. Petroleum resins typically have, as monomeric constituents, styrene, methylstyrene, vinyltoluene, indene, methylindene, butadiene, isoprene, piperylene, and/or pentylene. Styrene resins typically have, as monomeric constituents, styrene, methylstyrene, vinyltoluene, and/or butadiene. Cyclopentadiene resins typically have, as monomeric constituents, cyclopentadiene and optionally other monomers. Terpene resins typically have, as monomeric constitutents, pinene, alpha-pinene, dipentene, limonene, myrcene, and camphene.

Such additives may be employed insofar as they produce a finished sheet which is stable over time and to exposure to the elements, that is, additives which do not cause significant loss of clarity, interlayer adhesion or other desired characteristics.

Processes for Formation

The multi-layer sheet of the present invention may be melt co-extruded and cast into sheet form. A suitable method for casting a multi-layer sheet is to feed the resins into feed hoppers of single screw, twin screw, or other extruder systems having an extruder barrel temperature adjusted to produce a stable homogeneous melt. In order to aid processability, it is preferred that the melt viscosity of the various layers have similar values.

The melt streams can be co-extruded through a multi-layer or manifold/feedblock type sheet die onto a rotating cooled metal casting roll. Optionally, the casting roll can be partially immersed in a fluid-filled cooling bath, or, also optionally, the cast sheet can be passed through a fluid-filled cooling bath after removal from the casting roll. The temperatures of this operation can be chosen by those of skill in the art with the benefit of the teachings herein to provide the desired nucleation density, size, growth rate and interlayer adhesion such that the resulting finished multi-layer sheet has the desired characteristics and properties described herein. Typical casting wheel temperatures, as well as water bath temperatures, are below about 60° C., preferably below about 40° C., to provide a suitably crystalline multi-layer sheet.

An example of a multi-layer die process for making a three-layer sheet, as depicted in FIG. 3 by the window 12b, has the base layer conveyed in a Prodex single screw extruder (Prodex model 1.75TM-25, 44 mm, having an L/D of 30/1 and a screw compression ratio of 2.5/1, commercially available from Prodex Corporation, Fords, N.J. ). The extruder operates with zone temperatures increasing from 176° C. to 215° C. to the B manifold of a triple manifold die. The two outer layers are conveyed in individual Killion single screw extruders (Killion model KL-125, 32 mm having an L/D of 24/1 and a screw compression ratio of 2.5/1, commercially available from Killion Extruder Inc., Cedar Grove, N.J.). Each extruder operates with zone temperatures increasing from 176° C. to 215° C. to the A manifolds of a triple manifold die.

The triple manifold die is 406 mm wide and manufactured by Cloeren, Inc. of Orange Tex., and maintained at a temperature of 215° C. The resulting multi-layer extrudate stream is drop cast onto a 3-roll stack of chrome chill rolls set at a temperature of 4° C. and collected. The line speed is about 4 meters/minute and the individual flow rates of the protective layer materials and the base layer materials are such that the layer thicknesses may result in values exemplified in Table 2.

Subsequent to the melt co-extrusion, the multi-layer sheet may additionally be press polished to reduce surface imperfections in the multi-layer sheet. An example of a suitable press polishing technique includes pressing the multi-layer sheet between smooth polycarbonate panels, which are connected to metal plates via silicone pads. The metal plates are heated to about 121° C. and the polycarbonate panels apply about 68.9 MPa (Mega Pascals) pressure for about five minutes. After the pressurization and heating, the multi-layer sheet is immediately cooled.

Other processes may be used when the protective layers incorporate thermoset polyurethanes. Due to the thermal-activated cross-linking nature of thermoset polyurethanes, the above-described processes may cross-link the thermoset polyurethanes prematurely. Examples of suitable alternative processes for forming multi-layer sheets with protective layers comprising thermoset polyurethanes include pre-metered coating processes, laminating pre-formed thermoset polyurethane layers to a base layer, and other processes such as applying polyurethane composition to the base sheet by roll or gravure coating, followed by heat activating the thermosetting feature.

Examples of pre-metered coating processes include extrusion coating, slot-fed knife coating, and cross-flow knife coating. Pre-metered coating processes are beneficial due to the greater control over the residence time, which reduces the chance of cross-linking the thermoset polyurethane in the coating system.

Property Analysis and Characterization Procedures

The following test methods were used to evaluate examples of the present invention:

"TM1": ASTM G155 Cycle 1 test method, modified, using a black panel temperature of 70° C., using daylight filters with a water-cooled xenon arc lamp. Panels coated with the sample films were placed into an Atlas Weatherometer, Model Ci5000 (available from Atlas Testing Solutions, Chicago, Ill.). Weathered panels were typically tested after exposure to accelerated weathering exposure of 9360 kilojoules/m$^2$ at 340 nm, for 2000 hours.

"TM2": ASTM 1003.00 test method for light transmittance measurements of transparent plastics.

"TM3": ASTM 1003.00 test method for haze measurements of transparent plastics

"TM4": ASTM E308 and ASTM E903 test methods regarding the standard practice for identification of instrumental methods of color or color-difference measurement of materials and the standard practice for computing the colors of objects.

"TM5": ASTM D1044-99 test method for resistance of transparent plastics to surface abrasion, using CS-10 F wheels with 100 gram weights for 25 and 50 cycles. The transparent plastics are melted and layered onto a glass backing sheet. Initial baseline tests are made prior to the abrasion cycles. (TM5 incorporates TM3).

"TM6": ASTM D3111-99 test method for flexibility determination of hot-melt adhesives by mandrel bend test method, using a 6.4 mm mandrel at 25° C.

EXAMPLES

The present invention is more particularly described in the following examples that are intended as illustrations only. Unless otherwise noted, all parts, percentages, and ratios reported in the following examples are on a weight basis, and all reagents used in the examples were obtained, or are available, from general chemical suppliers such as the Sigma-Aldrich Chemical Company, Saint Louis, Mo., or may be synthesized by conventional techniques.

Composition Abbreviations

The following Protective Layer material abbreviations are used in the following Examples:

"PL1": An aliphatic thermoplastic polyurethane, commercially available as "Krystalgran PE284-200" from Huntsman Polyurethanes, Houston, Tex. Krystalgran PE284-200 was formerly designated as Krystalgran L433-65 (PL2).

"PL2": An aliphatic thermoplastic polyurethane, commercially available as "Krystalgran L433-65" from Huntsman Polyurethanes.

"PL3": An aliphatic thermoplastic polyurethane commercially available as "Texin DP7-3018" from Bayer Corporation.

"PL4": An aliphatic thermoplastic polyurethane, commercially available as "Tecoflex CLA-93A-V" from Thermedics Polymer Products, Wilmington, Mass.

"PL5": A waterborne polyurethane resin, commercially available as "NeoRez R960" from NeoResins, Frankfort, Ind.

"PL6": A thermoset polyurethane based on a two-component system of a polyol blend and an aliphatic polyisocyanate polyurethane, in a one-to-one ratio. The two-component system is described in Ho et al., U.S. Pat. No. 6,258,918, and is manufactured by 3M Company, St. Paul, Minn. The polyol blend is a mixture of Tone-301 polyol (from The Dow Chemical Co., Danbury, Conn.), Fomrez-55-112 polyol and Fomrez-55-225 polyol (from Crompton Corporation, Middlebury, Conn.), Tinuvin-292 hindered amine light stabilizer (from Ciba Specialty Chemicals, Tarrytown, N.Y.), Uvinul N-539 UV light absorber (from BASF Corp., Mount Olive, N.J.), Silwet L-7607 flow agent (from Crompton Corporation, Middlebury, Conn.), Dabco T-12 catalyst (from Air Product and Chemicals, Inc., Allentown, Pa.). The aliphatic polyisocyanate polyurethane is from Bayer Corporation as Desmodur XP-7100 aliphatic polyisocyanate polyurethane.

The following Base Layer material abbreviations are used in the following Examples:

"BL1": An ionomer based on a partially-neutralized ethylene methacrylic acid copolymer, available as "Surlyn 1857" from E.I. du Pont de Nemours & Company, Wilmington, Del.

"BL2": An ionomer based on a partially-neutralized ethylene methacrylic acid copolymer, available as "Surlyn 1705" from du Pont.

The following Resin Additive abbreviations are used in the Examples:

"UV1": A UV absorber, available as "Chemissorb 944" from Ciba Specialty Chemicals, Tarrytown, N.Y.

"UV2": A UV absorber, available as "Tinuvin 328" from Ciba Specialty Chemicals, Tarrytown, N.Y.

"UV3": A UV absorber, available as "Cyabsorb UV-1164" from Cytec Industries, Inc., West Paterson, N.J.

"LS1": A hindered amine light stabilizer, available as "Tinuvin 123" from Ciba Specialty Chemicals, Tarrytown, N.Y.

"LS2": A hindered amine light stabilizer, available as "Tinuvin 770" from Ciba Specialty Chemicals, Tarrytown, N.Y.

"AO1": An antioxidant, available as "Irganox B215" from Ciba Specialty Chemicals, Tarrytown, N.Y.

"PG1": A pigment, available as "Irgalite Blue BSP" from Ciba Specialty Chemicals, Tarrytown, N.Y.

"NA1": A clarifying nucleating agent available as "Millad 3988" from Milliken Chemical, Spartanburg, S.C.

"AD1": A silicone polyether copolymer, available as "Dow Coming 19 Additive" from Dow Coming Corp., Midland, Mich.

"2": A silicone glycol copolymer, available as "Dow Coming 28 Additive" from Dow Coming Corp., Midland, Mich.

Tables 5 and 6 provide concentrations of resin additives compounded into the protective layer and base layer materials. The concentrations are abbreviated as RA1–RA14, and are percentages by weight in the given resins. For example, resins for a protective layer or a base layer that include composition RA1 are 0.6% Chemissorb 944 UV absorber (UV1), 0.3% Tinuvin 328 UV absorber (UV2), 0.2% Irganox B215 antioxidant (AO1), and 98.9% resin, by weight. Compounding was performed at 135° C. under nitrogen purge until homogeneous.

TABLE 5

| Composition | UV1 | UV2 | UV3 | LS1 | AO1 |
|---|---|---|---|---|---|
| RA1 | 0.6 | 0.3 | None | None | 0.2 |
| RA2 | 0.5 | None | 1 | None | None |
| RA3 | None | None | 1 | 0.5 | None |

TABLE 6

| Composition | UV1 | LS1 | LS2 | PG1 | NA1 | AD1 | AD2 |
|---|---|---|---|---|---|---|---|
| RA4 | None | None | None | 0.0001 | None | None | None |
| RA5 | None | None | None | 0.000025 | None | None | None |
| RA6 | None | None | None | 0.0001 | None | None | None |
| RA7 | None | None | None | None | 0.000025 | None | None |
| RA8 | None | 1.0 | None | None | None | None | None |
| RA9 | None | None | 1.0 | None | None | None | None |
| RA10 | 1.0 | None | None | None | None | None | None |
| RA11 | None | None | 1.0 | None | None | 0.25 | None |
| RA12 | None | None | 1.0 | None | None | None | 0.25 |
| RA13 | None | None | 1.0 | 0.0001 | None | None | None |
| RA14 | None | None | 1.0 | 0.0001 | None | None | None |

Examples 1–16 and Comparatives A–D

Flexible windows, identified as Examples 1–16, were extruded by the multi-layer die process and press-polished as described above at 121° C. Table 7 provides the layer compositions for Examples 1–16. Resin additives were compounded into the given base layers and protective layers, as discussed above, prior to extrusion.

TABLE 7

| Sample | Base Layer | Base Layer Additive | Protective Layer | Protective Layer Additive |
|---|---|---|---|---|
| Example 1 | BL1 | None | PL4 | None |
| Example 2 | BL1 | None | PL2 | RA2 |
| Example 3 | BL1 | None | PL3 | RA3 |
| Example 4 | BL1 | None | PL3 | RA3 |
| Example 5 | BL1 | RA1 | PL4 | RA2 |
| Example 6 | BL1 | RA1 | PL2 | RA3 |
| Example 7 | BL1 | RA1 | PL2 | RA3 |
| Example 8 | BL1 | RA1 | PL3 | RA3 |
| Example 9 | BL1 | None | PL4 | RA2 |
| Example 10 | BL1 | None | PL4 | RA2 |
| Example 11 | BL1 | None | PL2 | RA2 |
| Example 12 | BL1 | None | PL2 | RA3 |
| Example 13 | BL1 | None | PL3 | RA2 |
| Example 14 | BL1 | RA1 | PL2 | RA3 |
| Example 15 | BL1 | RA1 | PL3 | RA3 |
| Example 16 | BL1 | RA1 | PL3 | RA3 |

As illustrated in Table 7, Examples 1–16 include a base layer derived from an ionomer based on a partially-neutralized ethylene methacrylic acid copolymer. The ionomer exhibits a melt flow index of 4.0 g/10 minutes when tested according to ASTM D1238-00 at 190° C. and with a 2.16 Kg weight. Examples 1–16 also include protective layers derived from aliphatic thermoplastic polyurethanes, and various combinations of additives.

The individual flow rates of the protective layer materials and the base layer materials were such that the layer thicknesses resulted in values provided in Table 8. "Nominal Total Thickness" values represent the desired total thicknesses of the flexible windows. "Actual total thickness" values represent an average of four samples cut from each co-extruded material.

TABLE 8

| Sample | Base Layer Thickness (mm) | Protective Layer Thickness (mm) | Nominal Total Thickness (mm) | Actual Total Thickness (mm) |
|---|---|---|---|---|
| Example 1 | 0.914 | 0.051 | 1.016 | 1.092 |
| Example 2 | 0.914 | 0.051 | 1.016 | 1.022 |
| Example 3 | 0.914 | 0.051 | 1.016 | 1.007 |
| Example 4 | 0.914 | 0.051 | 1.016 | 1.102 |
| Example 5 | 0.914 | 0.051 | 1.016 | 0.702 |
| Example 6 | 0.914 | 0.051 | 1.016 | 1.045 |
| Example 7 | 0.914 | 0.051 | 1.016 | 0.753 |
| Example 8 | 0.914 | 0.051 | 1.016 | 0.978 |
| Example 9 | 0.660 | 0.051 | 0.762 | 0.870 |
| Example 10 | 0.660 | 0.051 | 0.762 | 0.953 |
| Example 11 | 0.660 | 0.051 | 0.762 | 0.787 |
| Example 12 | 0.660 | 0.051 | 0.762 | 0.848 |
| Example 13 | 0.660 | 0.051 | 0.762 | 0.829 |
| Example 14 | 0.660 | 0.051 | 0.762 | 0.841 |
| Example 15 | 0.660 | 0.051 | 0.762 | 0.810 |
| Example 16 | 0.457 | 0.051 | 0.508 | 1.124 |

Comparative examples include:

Comparative A: A flexible UV-stabilized vinyl film, commercially available as "Crystal Clear 20/20" from Strataglass, Ltd., Ft. Lauderdale, Fla.

Comparative B: A flexible UV-stabilized vinyl film with an abrasion-resistant coating believed to be a UV-cured acrylic-urethane, available as "Strataglass" from Strataglass, Ltd.

Comparative C: A PVC base layer disposed between protective layers manufactured as TD651-35% from Sumitomo 3M, Tokyo, Japan. The PVC base layer includes PVC, DOP/adipic acid polyester plasticizer, antioxidant, and 2-(2'-Hydroxy-3'-t-butyl-5'-methylphenyl)-5-chlorobenzotriazole UV-absorber. The plasticizer is 35% of the base layer by weight. The protective layers each include a 2-part polyurethane of an acrylic polyol crosslinked by an HDI trimer. The protective layers also contain 2-(2'-Hydroxy-3'-t-butyl-5'-methylphenyl)-5-chlorobenzotriazole UV-absorber and a hindered amine light stabilizer.

Comparative D: A PVC base layer disposed between protective layers manufactured as TD651-39% from Sumitomo 3M, Tokyo, Japan. The PVC base layer includes PVC, DOP/adipic acid polyester plasticizer, antioxidant, and 2-(2'-Hydroxy-3'-t-butyl-5'-methylphenyl)-5-chlorobenzotriazole UV-absorber. The plasticizer is 39% of the base layer by weight. The protective layers each include a 2-part polyurethane of an acrylic polyol crosslinked by an HDI trimer. The protective layers also contain 2-(2'-Hydroxy-3'-t-butyl-5'-methylphenyl)-5-chlorobenzotriazole UV-absorber and a hindered amine light stabilizer.

Weathering Test for Examples 1–16 and Comparatives A–D

Examples 1–16 and Comparatives A–D were subjected to weathering pursuant to TM1. Table 9 provides values of the initial transmittances, the post-weathering transmittance, and the change in (Δ) transmittances exhibited by Examples 1–16 and Comparatives A–D. The transmittance is the percentage of light transmittance exhibited, when tested according to TM2, prior to the weathering. Correspondingly, the post-weathering transmittance is the percentage of light transmittance exhibited, when tested according to TM2, after the weathering. Δtransmittance is the change in the percentage of light transmittance due to the weathering, and is the difference between the initial transmittance and the post-weathering transmittance.

TABLE 9

| Sample | Initial Transmittance (%) | Post-Weathering Transmittance (%) | ΔTransmittance (%) |
|---|---|---|---|
| Example 1 | 90.2 | 90.15 | −0.05 |
| Example 2 | 90.1 | 91.45 | 1.35 |
| Example 3 | 92.0 | 91.30 | −0.70 |
| Example 4 | 91.7 | 90.80 | −0.90 |
| Example 5 | 92.4 | 92.65 | 0.25 |
| Example 6 | 91.7 | 91.50 | −0.20 |
| Example 7 | 93.2 | 92.20 | −1.00 |
| Example 8 | 92.6 | 91.85 | −0.75 |
| Example 9 | 93.2 | 91.95 | −1.25 |
| Example 10 | 91.3 | 90.95 | 0.35 |
| Example 11 | 91.6 | 91.15 | 0.45 |
| Example 12 | 92.5 | 92.00 | −0.50 |
| Example 13 | 92.7 | 91.80 | −0.80 |
| Example 14 | 91.9 | 92.30 | 0.40 |
| Example 15 | 91.2 | 92.40 | 1.20 |
| Example 16 | 91.4 | 91.00 | −0.40 |
| Comparative A | 87.4 | 89.85 | 2.45 |
| Comparative B | 87.3 | 90.50 | 3.20 |
| Comparative C | 90.9 | 90.45 | −0.45 |
| Comparative D | 90.8 | 90.90 | 0.10 |

The data provided in Table 9 illustrates high values for both initial and post-weathering transmittances exhibited by Examples 1–16. This is further illustrated by the low changes in percentages of transmittances exhibited after the weathering. Values provided are averages of multiple measurements.

The light transmittance values of Examples 1–16 are on par with the light transmittance values of Comparatives A–D, which also showed little change in transmittance values. However, all of the Comparatives have a high concentration of plasticizers in the base layers (Comparatives C and D having 35% and 39%, respectively). These plasticizers may eventually migrate to the surfaces of the materials, which can reduce transparencies.

Both Crystal Clear 20/20 (Comparative A) and Strataglass (Comparative B) are considered state-of-the-art materials for plastic windows, exhibiting good transparencies. On the other end of the spectrum, an unprotected PVC film generally exhibits an initial transmittance value on the same level as Crystal Clear 20/20. However, after weathering, as set forth in TM1, unprotected PVC film becomes dark brown and generally exhibits a post-weathering transmittance less than 20%, substantially lower than any of the samples in Table 9.

Table 10 provides values of the initial haze levels, post-weathering haze levels, and Δhaze levels exhibited by Examples 1–16 and Comparatives A–D. The initial haze level is the percentage of haze exhibited, when tested according to TM3, prior to the weathering. The post-weathering haze level is the percentage of haze exhibited, when tested according to TM3, after the weathering. Δhaze is the change in the percentage of haze due to the weathering.

TABLE 10

| Sample | Initial Haze (%) | Post-Weathering Haze (%) | Δ Haze (%) |
|---|---|---|---|
| Example 1 | 3.9 | 14.8 | 10.9 |
| Example 2 | 3.7 | 7.1 | 3.4 |
| Example 3 | 2.8 | 10.0 | 7.2 |
| Example 4 | 3.9 | 10.9 | 7.0 |

TABLE 10-continued

| Sample | Initial Haze (%) | Post-Weathering Haze (%) | Δ Haze (%) |
|---|---|---|---|
| Example 5 | 3.3 | 5.4 | 2.1 |
| Example 6 | 2.3 | 3.6 | 1.3 |
| Example 7 | 2.4 | 8.6 | 6.2 |
| Example 8 | 4.1 | 8.5 | 4.4 |
| Example 9 | 1.9 | 4.2 | 2.3 |
| Example 10 | 3.7 | 5.0 | 1.3 |
| Example 11 | 2.8 | 9.9 | 7.1 |
| Example 12 | 1.8 | 4.6 | 2.8 |
| Example 13 | 2.2 | 24.0 | 21.8 |
| Example 14 | 2.6 | 4.2 | 1.6 |
| Example 15 | 8.0 | 6.0 | −2.0 |
| Example 16 | 3.2 | 8.2 | 5.0 |
| Comparative A | 1.5 | 2.1 | 0.6 |
| Comparative B | 1.3 | 1.9 | 0.6 |
| Comparative C | 4.2 | 4.1 | −0.1 |
| Comparative D | 5.0 | 3.4 | −1.6 |

The data provided in Table 10 illustrates adequate values for initial and post-weathering haze levels exhibited by Examples 1–16. In particular, Example 6 exhibits a low initial haze and a low change in haze values due to the weathering. Example 6 exhibits little increase in light scattering after being subjected to substantial exposure to heat, UV-radiation, and moisture.

Table 11 provides values of the initial $b^*$ value, the post-weathering $b^*$ value, and the $\Delta b^*$ value exhibited by Examples 1–16 and Comparatives A–D. The $b^*$ values indicate the amount of yellow ($b^*>0$) or blue ($b^*<0$) hue the samples exhibit. The initial $b^*$ value is the $b^*$ value exhibited, when tested according to TM4, prior to the weathering. The post-weathering $b^*$ value is the $b^*$ value exhibited when tested according to TM4, after the weathering. $\Delta b^*$ is the change in the $b^*$ value due to the weathering.

TABLE 11

| Sample | Initial $b^*$ Value | Post-Weathering $b^*$ Value | $\Delta b^*$ Value |
|---|---|---|---|
| Example 1 | 4.88 | 4.63 | −0.25 |
| Example 2 | 5.14 | 7.20 | 2.06 |
| Example 3 | 4.78 | 7.43 | 2.65 |
| Example 4 | 6.44 | 5.64 | −0.80 |
| Example 5 | 4.15 | 7.39 | 3.24 |
| Example 6 | 5.17 | 8.08 | 2.91 |
| Example 7 | 4.26 | 7.45 | 3.19 |
| Example 8 | 5.72 | 8.42 | 2.70 |
| Example 9 | 5.13 | 7.29 | 2.16 |
| Example 10 | 5.25 | 8.89 | 3.64 |
| Example 11 | 4.30 | 4.74 | 0.44 |
| Example 12 | 5.80 | 5.99 | 0.19 |
| Example 13 | 5.90 | 4.97 | −0.93 |
| Example 14 | 5.85 | 7.04 | 1.19 |
| Example 15 | 3.86 | 8.51 | 4.65 |
| Example 16 | 4.14 | 6.49 | 2.35 |
| Comparative A | 0.31 | 1.93 | 1.62 |
| Comparative B | 1.03 | 1.60 | 0.57 |
| Comparative C | 5.00 | 3.98 | −1.02 |
| Comparative D | 3.47 | 3.60 | 0.13 |

The data provided in Table 11 illustrates adequate values for initial and post-weathering $b^*$ values exhibited by Examples 1–16. The initial and post-weathering $b^*$ values are greater than the initial and post-weathering $b^*$ values of Comparatives A–D. However, when Examples 1–16 are compared to an unprotected PVC film, Examples 1–16 exhibit post-weathering $b^*$ values substantially lower than the unprotected PVC film. Unprotected PVC film generally exhibits an initial $b^*$ value on the same level as Crystal Clear 20/20. However, after weathering, as set forth in TM1, unprotected PVC film becomes dark brown and generally exhibits a post-weathering $b^*$ value greater than 20. This is substantially greater than any of the samples in Table 11, and renders the unprotected PVC film essentially useless as a plastic window.

Based upon the data provided in Tables 9–11, a particularly suitable flexible window combination is Example 6, a three-layer sheet approximately 1.045 mm thick. The base layer comprises about 0.6% Chemissorb 944 UV absorber, 0.3% Tinuvin 328 UV absorber, 0.2% Irganox B215 antioxidant, and 98.9% ionomer resin based on a partially-neutralized ethylene methacrylic acid copolymer. Two protective layers are disposed on each planar surface of the base layer, and comprise about 0.5% Tinuvin 123 hindered amine light stabilizer, 1.0% Cyabsorb UV-1164 UV absorber, and 98.5% resin of Krystalgran L433-65 aliphatic thermoplastic polyurethane.

Abrasion Test for Example 6 and Comparatives A and B

Example 6 and Comparatives A and B were subjected to an abrasion test pursuant to TM5, to measure abrasion resistance. Tables 12 and 13 provide light transmittance and haze values exhibited by Example 6 and Comparatives A and B. Table 12 provides initial, 25-cycle, and 50-cycle transmittance values. The initial transmittance values were measured prior to the abrasion testing. The 25-cycle transmittance values were measured after 25 cycles of abrasion pursuant to TM5. The 50-cycle transmittance values were measured after 50 cycles of abrasion pursuant to TM5.

TABLE 12

| Sample | Initial Transmittance (%) | 25-cycle Transmittance (%) | 50-Cycle Transmittance (%) |
|---|---|---|---|
| Example 6 | 86.4 | 84.7 | 84.9 |
| Comparative A | 80.4 | 79.2 | 79.6 |
| Comparative B | 80.9 | 81 | 81 |

The data provided in Tables 12 illustrates a high initial transmittance value for Example 6, greater than the initial transmittance values of Comparatives A and B. After both the 25-cycle and 50-cycle measurements, Example 6 and Comparatives A and B all exhibit low changes in transmittance values. However, Example 6 still exhibits greater transmittance values than either Comparative A or B.

Table 13 provides initial, 25-cycle, and 50-cycle haze values. Initial haze values were measured prior to the abrasion testing, the 25-cycle haze values were measured after 25 cycles of abrasion pursuant to TM5, and the 50-cycle haze values were measured after 50 cycles of abrasion (TM5).

TABLE 13

| Sample | Initial Haze (%) | 25-Cycle Haze (%) | 50-Cycle Haze (%) |
|---|---|---|---|
| Example 6 | 3.02 | 3.07 | 3.79 |
| Comparative A | 1.96 | 26.4 | 35.6 |
| Comparative B | 1.96 | 4.87 | 8.33 |

The data provided in Table 13 illustrate the greater abrasion resistance of Example 6 compared to Comparatives A and B. While Example 6 exhibits a greater initial haze value than of Comparatives A and B, the initial haze value of Example 6 is acceptable. With respect to the 25-cycle haze values, both the Comparatives A and B begin to show signs of abrasion. The percentage of haze for Comparative B doubled from the initial haze value, and the percentage of haze for Comparative A increased 13 times. In contrast, Example 6 exhibited little change in the percentage haze values. With respect to the 50-cycle haze values, Comparative A exhibited a haze level almost ten times greater than the haze level of Example 6. Comparative B exhibited a haze level over two times greater than the haze level of Example 6.

Flexibility Test for Examples 1–16

Examples 1–16 were subjected to a flexibility test (TM6). They were all found to be flexible enough that Examples 1–16 did not produce visual cracking to the unaided eye.

Examples 17–28

Flexible windows, identified as Examples 17–28, were extruded with the multi-layer die process and press-polished at 121° C. as described above under the section entitled "Processes of Formation". Table 14 provides the layer compositions for Examples 17–28. Resin additives were compounded into the given base layers and protective layers, as discussed above, prior to extrusion.

TABLE 14

| Sample | Base Layer | Base Layer Additive | Protective Layer | Protective Layer Additive |
|---|---|---|---|---|
| Example 17 | BL1 | None | PL1 | None |
| Example 18 | BL1 | None | PL1 | RA8 |
| Example 19 | BL1 | None | PR1 | RA9 |
| Example 20 | BL1 | None | PL1 | RA10 |
| Example 21 | BL1 | None | PL3 | RA8 |
| Example 22 | BL1 | None | PL3 | RA9 |
| Example 23 | BL1 | None | PL3 | RA11 |
| Example 24 | BL1 | None | PL3 | RA12 |
| Example 25 | BL1 | RA4 | PL3 | RA13 |
| Example 26 | BL1 | RA5 | PL3 | RA14 |
| Example 27 | BL1 | RA6 | PL3 | RA14 |
| Example 28 | BL1 | RA7 | PL3 | RA8 |

Examples 17–28 include a base layer derived from an ionomer based on a partially-neutralized ethylene methacrylic acid copolymer. The ionomer exhibits a melt flow index of 4.0 g/10 minutes when tested according to ASTM D1238-00 at 190° C. and with a 2.16 Kg weight. Examples 17–28 also include protective layers comprising aliphatic thermoplastic polyurethanes, and various combinations of additives. The layer thicknesses for Examples 17–28 are in Table 15.

TABLE 15

| Sample | Base Layer Thickness (mm) | Protective Layer Thickness (mm) | Nominal Total Thickness (mm) |
|---|---|---|---|
| Example 17 | 0.914 | 0.051 | 1.016 |
| Example 18 | 0.914 | 0.051 | 1.016 |
| Example 19 | 0.914 | 0.051 | 1.016 |
| Example 20 | 0.914 | 0.051 | 1.016 |
| Example 21 | 0.914 | 0.051 | 1.016 |
| Example 22 | 0.914 | 0.051 | 1.016 |
| Example 23 | 0.914 | 0.051 | 1.016 |
| Example 24 | 0.914 | 0.051 | 1.016 |
| Example 25 | 0.914 | 0.051 | 1.016 |
| Example 26 | 0.914 | 0.051 | 1.016 |
| Example 27 | 0.914 | 0.051 | 1.016 |
| Example 28 | 0.914 | 0.051 | 1.016 |

Examples 29–31

Example 29 is a 0.762 mm film prepared from three multi-layer sheets compressed together. Each of the three sheets consisted of a 0.254 mm thick film having a base layer of BL2, a protective coating of PL5 on one planar surface of the base layer, and a pressure sensitive adhesive on the opposing planar surface. The three sheets were cold pressed between polycarbonate sheets at 20° C. and 137.9 MPa for about five minutes. The sheets were oriented such that protective coatings were exposed on both exterior surfaces of the film (i.e., two sheets were oriented in the same direction and the third sheet was inverted relative to the other two sheets).

Example 30 was prepared according to the method described in Example 29, and was further knife coated on both exterior surfaces with PL6. Each PL6 layer was 0.076 mm thick, for a total film thickness of 0.914 mm.

Example 31 is a three-layer film prepared from a 0.762 mm base layer consisting of BL1, which was knife coated on each planar surface with PL6. Each PL6 layer was 0.076 mm thick, for a total film thickness of 0.914 mm.

Weathering Test for Examples 17–31

Examples 17–31 and Comparatives E and F were subjected to weathering pursuant to TM1. Table 16 provides values of the post-weathering transmittance, post-weathering haze, and post-weathering b* value.

TABLE 16

| Sample | Post-Weathering Transmittance (%) | Post-Weathering Haze (%) | Post-Weathering b* Value |
|---|---|---|---|
| Example 17 | 90.1 | 17.7 | 3.22 |
| Example 18 | 91.1 | 5.1 | 2.61 |
| Example 19 | 88.8 | 17.4 | 5.09 |
| Example 20 | 90.5 | 21.6 | 3.23 |
| Example 21 | 91.2 | 16.5 | 2.81 |
| Example 22 | 90.8 | 19.8 | 3.49 |
| Example 23 | 90.7 | 34.9 | 3.29 |
| Example 24 | 90.4 | 37.3 | 3.09 |
| Example 25 | 90.5 | 31.2 | 2.98 |
| Example 26 | 90.0 | 28.3 | 4.25 |
| Example 27 | 91.0 | 29.1 | 2.98 |
| Example 28 | 89.0 | 20.1 | 5.48 |
| Example 29 | 90.0 | 13.2 | 1.38 |
| Example 30 | 92.7 | 24.3 | 1.17 |
| Example 31 | 90.4 | 12.3 | 3.35 |

The data provided in Table 16 illustrates good values for post-weathering light transmittances for Examples 17–31.

Examples 19–31 exhibited relatively high values of post-weathering haze. This is believed due to the particular additives in the base layer and protective layer resins. For example, the materials including the Tinuvin 770 hindered amine light absorber (LS2) generally exhibited higher values of haze after weathering.

Table 16 also illustrates adequate post-weathering b* values for Examples 17–31. Examples 17–31 exhibit post-weathering b* values substantially lower than unprotected PVC film. After weathering, as set forth in TM1, unprotected PVC film becomes dark brown and generally exhibits a post-weathering b* value greater than 20. Based upon the data provided in Table 16, another particularly suitable flexible window combination is Example 18.

Although the present invention has been described with reference to preferred embodiments, workers skilled in the art will recognize that changes may be made in form and detail without departing from the spirit and scope of the invention.

The invention claimed is:

1. A transparent multi-layer sheet, having light transmittance greater than 90%, comprising:
   a transparent flexible base layer formed of a substantially plasticizer-free polymeric material selected from the group consisting of ionomers, polyolefin homopolymers, polyolefin copolymers, block copolymers, fluorothermoplastics, polyurethanes, and combinations thereof; and
   first and second transparent flexible protective layers located on opposite sides of the base layer, each having a greater abrasion resistance than the transparent flexible base layer, and formed of a substantially plasticizer-freepolyurethane, the thickness of each protective layer being 50–130 micrometers;
   said transparent multi-layer sheet being sufficiently flexible to allow rolling it into a cylindrical shape without cracking or fracturing when it is tested according to ASTM test number D3 111-99 using a 6.4 mm mandrel at 250° C.

2. The transparent multi-layer sheet of claim 1 having an absence of tie layers.

3. The multi-layer sheet of claim 1, wherein the ionomers are selected from the group consisting of partially-neutralized ethylene acrylic acid copolymers, partially-neutralized ethylene methacrylic acid copolymers, partially-neutralized propylene acrylic acid copolymers, partially-neutralized propylene methacrylic acid copolymers, and combinations thereof.

4. The transparent multi-layer sheet of claim 1, wherein the ionomers further exhibit a melt flow index of 5.0 g/10 minutes or less when tested according to ASTM D1238-00 at 1900° C. and with a 2.16 Kg weight.

5. A window comprising the multi-layer sheet of claim 1.

6. The multi-layer sheet of claim 1 having a thickness of 0.25–1.52 millimeters.

7. The multi-layer sheet of claim 1 characterized by
   i) an absence of visual cracking to the unaided eye when tested according to ASTM D3111-99 using a 6.4 mm mandrel at 250° C.;
   ii) after being subjected to weathering conditions, as set forth in ASTM G155 Cycle 1; exhibiting a light transmittance level of at least about 90% when tested according to ASTM 1003.00; and
   iii) being substantially free of plasticizers.

8. A multi-layer sheet comprising:
   a base layer comprising an ionomer; and
   first and second protective layers located on opposite sides of the base layer, each comprising polyurethane and being 50–130 micrometers thick;
   wherein the multi-layer sheet is substantially free of plasticizers, transparent, having a light transmittance greater than 90%, and sufficiently flexible to allow rolling it into a cylindrical shape without cracking or fracturing when it is tested according to ASTM test number D3111-99 using a 6.4 mm mandrel at 250° C.

9. The multi-layer sheet of claim 8, wherein the ionomer is selected from the group consisting of partially-neutralized ethylene acrylic acid copolymers, partially-neutralized ethylene methacrylic acid copolymers, partially-neutralized propylene acrylic acid copolymers, partially-neutralized propylene methacrylic acid copolymers, and combinations thereof.

* * * * *

UNITED STATES PATENT AND TRADEMARK OFFICE
CERTIFICATE OF CORRECTION

PATENT NO. : 7,147,923 B2
APPLICATION NO. : 10/740986
DATED : December 12, 2006
INVENTOR(S) : Gary P. Roberts It is certified that error appears in the above-identified patent and that said Letters Patent is hereby corrected as shown below:

Column 12
Line 45, delete the word "constitutents," and insert in place thereof -- constituents, --.

Column 14
Line 16, after the word "plastics" insert -- . --.

Column 15
Line 46, delete ""2";" and insert in place thereof -- "AD2": --.
Line 47, delete the word "Coming" and insert in place thereof -- Corning --.

Column 23
Line 14, in claim 1 delete the word "freepolyurethane," and insert in place thereof -- free polyurethane, --.
Line 20, in claim 1 delete "250°C." and insert in place thereof -- 25°C --.
Line 33, in claim 4 delete "1900°C." and insert in place thereof -- 190°C. --.

Column 24
Line 7, in claim 7 delete "250°C.;" and insert in place thereof -- 25°C.; --.
Line 24, in claim 8 delete "250°C." and insert in place thereof -- 25°C. --.

Signed and Sealed this

Third Day of April, 2007

JON W. DUDAS
*Director of the United States Patent and Trademark Office*